Patented May 8, 1945

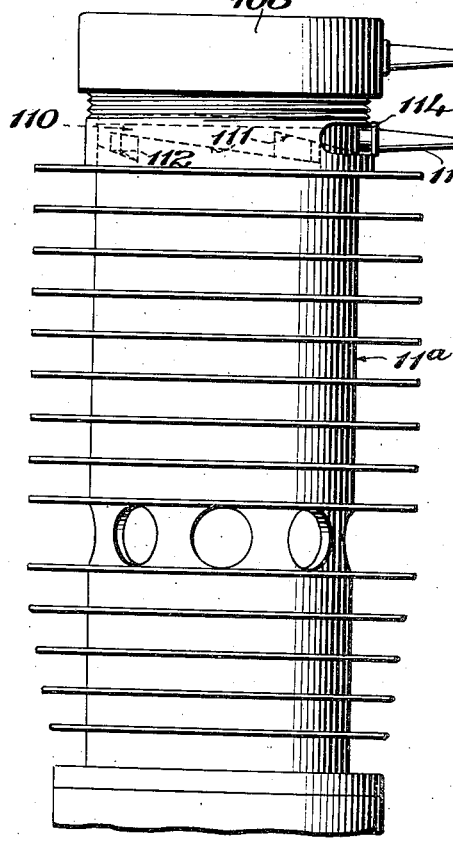
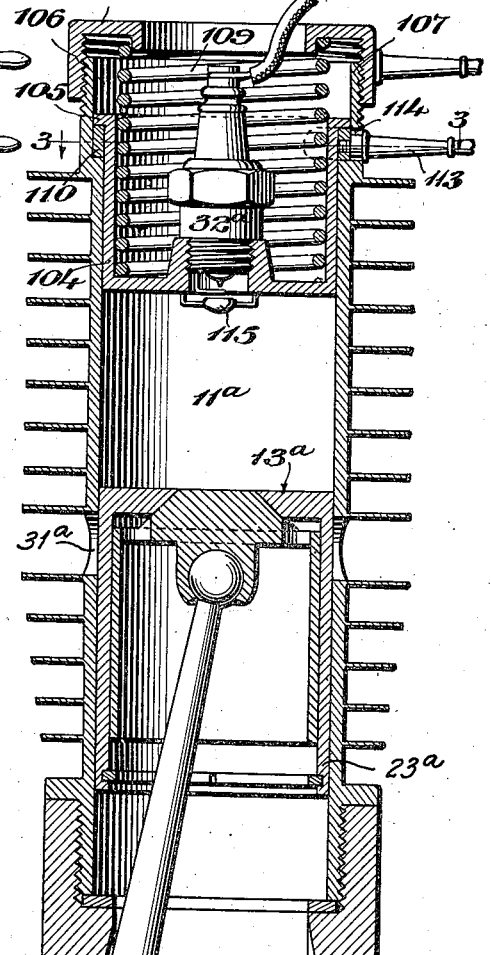
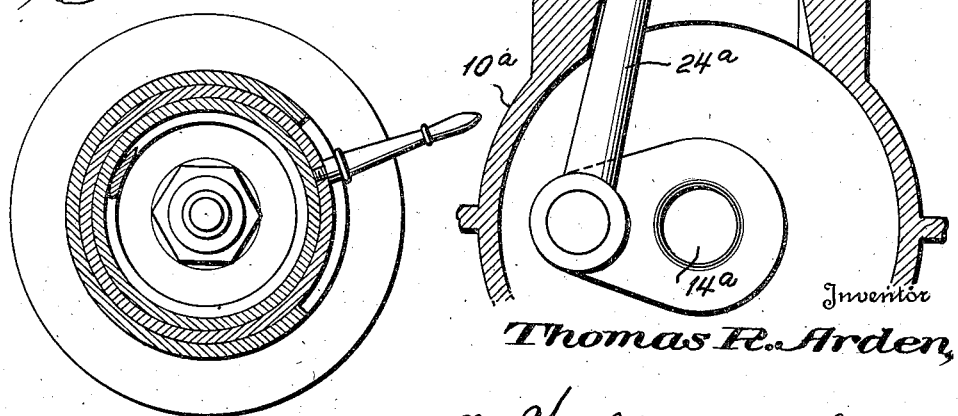

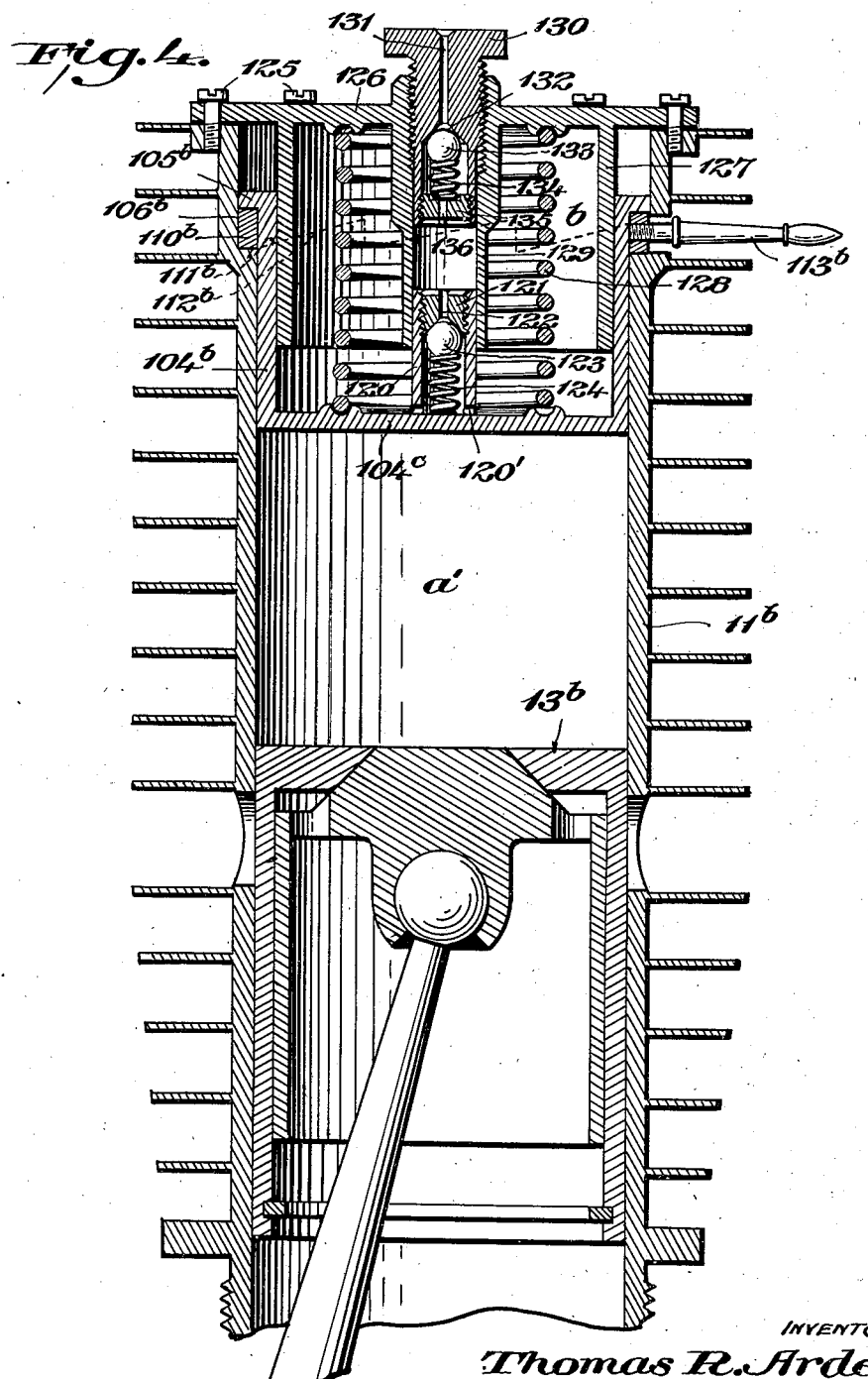

2,375,183

UNITED STATES PATENT OFFICE 2,375,183

INTERNAL-COMBUSTION ENGINE

Thomas R. Arden, Danbury, Conn., assignor to Bard-Parker Company, Inc., Danbury, Conn., a corporation of New York Application February 27, 1942, Serial No. 432,709

7 Claims. (Cl. 123—48)

This invention relates to internal combustion engines, and has particular reference to self-ignition internal combustion engines of the type disclosed in my prior application, Serial No. 278,-772, filed June 12, 1939 (now Patent No. 2,274,644, dated March 3, 1942), of which the present application is, in part, a continuation.

Generally speaking, the object of the invention is to provide an internal combustion engine embodying a practical construction whereby the same may be successfully operated at various different speeds within a wide range, and whereby its speed may quickly be accelerated and decelerated, and which may even be started, without fuel injection such as characterizes internal combustion engines of the Diesel type, and also without spark ignition such as characterizes ordinary internal combustion engines employing gasoline as fuel.

With the foregoing and other objects in view, which will become more fully apparent as the nature of the invention is better understood, the same consists in a self-ignition internal combustion engine embodying the novel features of construction, combination and arrangement of parts as will be hereinafter more fully described, illustrated in the accompanying drawings and defined in the appended claims.

In the accompanying drawings, wherein like characters of reference denote corresponding parts in related views:

Figure 1 is a side elevation of a portion of a self-ignition internal combustion engine constructed in accordance with one practical embodiment of the invention.

Figure 2 is a central, vertical section through the engine structure shown in Fig. 1.

Figure 3 is a horizontal section on the line 3—3 of Fig. 2; and

Figure 4 is a view similar to Fig. 2 illustrating an alternative form of the invention.

It is known that an internal combustion engine whose proportions are designed correctly, according to known standards, will function without spark ignition and without fuel injection, such as characterizes engines of the Diesel type, when the compression, speed, temperature and other factors are brought to a critical point, and the present invention resides in means for attaining and maintaining this critical point for any given speed of operation of an engine, and for quickly varying such point in accordance with desired changes in the speed of the engine, whereby the aforesaid general object of the invention is accomplished.

Referring to the drawings in detail, first with particular reference to the embodiment of the invention illustrated in Figs. 1 to 3, it will be observed that the present engine is of the reciprocating type and includes, as usual, a crank case $10^a$, a crank shaft $14^a$, a cylinder $11^a$, a piston $13^a$ reciprocable within the cylinder $11^a$, and a connecting rod $24^a$ providing an operative connection between the piston $13^a$ and the crank shaft $14^a$ whereby reciprocating motion of said piston is translated into rotary motion of said crank shaft.

It will further be observed that the engine illustrated in Figs. 1 to 3 is of the two-stroke-cycle type in which the cylinder $11^a$ is provided with exhaust ports $31^a$ to be uncovered by the piston $13^a$ as the latter nears the end of its inward or power stroke, and in which fuel is delivered from the crank case $10^a$ to the cylinder $11^a$ through a port $26^a$ in the outer end of the piston $13^a$ under the control of a valve $27^a$ at the outer end of a sleeve $23^a$ which is reciprocable within the piston $13^a$ and through the instrumentality of which said piston is operatively connected with the crank shaft $14^a$ by the rod $24^a$, all as more fully described in my aforesaid Patent No. 2,274,644. However, it is desired to point out in this connection that the improvements constituting the present invention are equally capable of use either in association with four-stroke-cycle engines or in association with two-stroke-cycle engines having means other than the means herein illustrated and described for controlling admission of fuel to and exhaust of products of combustion from the cylinder $11^a$. In other words, the improvements constituting the present invention reside essentially in the provision of a cylinder head which is movable longitudinally with respect to the cylinder to vary the capacity of the combustion chamber of the engine; which is resiliently urged inwardly so as to be capable of moving outwardly under the force of a charge of fuel exploding in the combustion chamber, and which has associated therewith adjustable means for variably predetermining its innermost position. These essentials may be embodied in practically any internal combustion engine of the reciprocating piston type regardless of the number of strokes per cycle of the engine and regardless of the particular means employed to control admission of fuel to and exhaust of products of combustion from the engine. Accordingly, it will be understood that, apart from these essentials, the engine may be of any construction and may have any usual mode of operation except as affected by the said improvements.

In accordance with the invention as illustrated in Figs. 1 to 3, the cylinder 11a has mounted in its outer end, for longitudinal sliding movement relative to said cylinder to vary the capacity of the combustion chamber a, a cylinder head designated as 104. This head is of cap-like form, closed at its inner end and open at its outer end and, at its outer end is provided with an annular, outwardly extending flange 105 which is disposed within a counter-bore 106 in an enlarged extreme outer end portion 107 of the cylinder 11a.

Threaded on the outer end portion 107 of the cylinder 11a is a cap member 108 and between this cap member and the cylinder head 104 is interposed a coil spring 109 which urges the cylinder head constantly inwardly.

Disposed in the counterbore 106 of the cylinder 11a in surrounding relationship to the cylinder head 104 and interposed between the flange 105 and the wall defining the bottom of said counterbore is a ring 110 which is rotatably adjustable and which has its inner edge formed with a series of inclined cam faces 111 for cooperation with a companion series of cam faces 112 formed on the wall defining the inner end of the counterbore 106.

The ring 110 constitutes a stop engageable by the flange 105 of the cylinder head 104 to limit inward movement of the cylinder head. By rotating the ring 110 in one direction it will be moved outwardly due to the cooperation of its cam faces 111 with the cam faces 112 and will move the cylinder head outwardly. On the other hand, by rotating said ring in the opposite direction, inward movement of the cylinder head by the spring 109 will be permitted. Rotation of the ring 110 may be effected in any suitable manner. In the present instance there is illustrated for this purpose a means in the form of a handle 113 projecting laterally from said ring through a slot 114 in the outer end portion 107 of the cylinder 11a. In any event, by rotatable adjustment of the ring 110 the inner limit of movement of the cylinder head 104 may variably be predetermined to variably predetermine the normal capacity of the combustion chamber of the engine.

The force exerted inwardly upon the cylinder head 104 by the spring 109 may be varied by rotating the cap member 108 to thread same inwardly or outwardly along the portion 107 of the cylinder. In any event, the strength of the spring 109 at all times is sufficient to prevent outward movement of the cylinder head under self-ignition pressure in the combustion chamber of the engine. The strength of said spring is not so great, however, as to prevent outward movement of the cylinder head under the force of an exploded charge in the cylinder.

Preferably the engine is provided with a spark-plug 32a whereby it may be started using spark ignition. Preferably, too, a heat retaining element 115 is provided in the combustion chamber of the engine to assist self-ignition. However, neither said spark-plug nor said element 115 is essential, as the engine may be started by self-ignition and will operate without the element 115.

Since varying the area of the combustion chamber of the engine determines the time at which, during outward movement of the piston 23a, self-ignition pressure will develop in the combustion chamber, and since the time at which ignition takes place in large measure determines the speed of the engine, it is apparent that, by rotating the ring 110 to vary the area of the combustion chamber of the engine, the speed of operation of the engine under self-ignition may be varied within a wide range. This would not be possible if the cylinder head were positively restrained against outward movement, for in that case, if ignition occurred prior to the piston 23a reaching a definite position short of its outermost position, explosion of a charge in the combustion chamber of the engine would prevent further outward movement of the piston. Due, however, to the cylinder head 104 being yieldably restrained against outward movement, it may yield outwardly under the force of an explosion in the combustion chamber to relieve the pressure therein and permit outward movement of the piston to continue even though ignition may occur at an early instant during outward movement of the piston. Outward movement of the cylinder head stores in the spring 109 energy which subsequently is expended in assisting to drive the piston inwardly. By the selection of a spring 109 of a certain inherent strength and by proper adjustment of the same by the cap piece 108 in relation to different adjustments of the innermost limit of movement of the cylinder head, the engine may be made to operate successfully within a wide speed range, and may, even be started, employing self-ignition as distinguished from spark ignition. Such an engine is particularly advantageous in eliminating all spark ignition mechanism and, as a power plant for miniature aircraft, is further particularly advantageous in that it eliminates the necessity of the aircraft carrying a weighty battery to furnish current for spark ignition.

Referring now to the embodiment of the invention illustrated in Fig. 4 of the drawings, it will be observed that the construction and mode of operation of the means constituting the invention is generally the same as the means illustrated in Figs. 1 to 3, except that air pressure instead of a spring is employed primarily to restrain the cylinder head against outward movement during operation of the engine.

In accordance with the embodiment of the invention illustrated in Fig. 4, the engine cylinder, designated as 11b, has mounted in its outer end, for longitudinal sliding movement relative thereto, as in the case of the Figs. 1 to 3 embodiment of the invention, a cup-shaped head, designated as 104b, which is provided at its outer end with an annular, outwardly extending flange 105b disposed within a counterbore 106b in the outer end of the cylinder 11b. Moreover, the wall 104c defining the inner end of the cylinder head 104b has located preferably centrally thereof and extending outwardly therefrom a hollow pump piston 120 in the inner end portion of which are ports 120' providing communication between its interior and the interior of said cylinder head 104b and in the outer end of which is a plug 121 having a port 122 controlled by an inwardly opening check valve 123 of any suitable type which normally is urged outwardly against said seat in closing relationship to said port by a coil spring 124 interposed between said valve and the inner end wall 104c of the cylinder head 104b.

Suitably secured to the outer end of the cylinder 11b, as by means of screws 125, is a cap member 126 which has extending inwardly therefrom into and closely fitting the cylinder head 104ᵇ a cylindrical skirt portion 127, while interposed between said cap member and the wall 104ᶜ of said cylinder head 104ᵇ is a coil spring 128 which tends constantly to urge said cylinder head inwardly.

The cap member 126 carries, preferably centrally thereof, an inwardly extending pump cylinder 129 into the inner end portion of which the pump piston 120 slidably extends.

Threaded in the outer end portion of the pump cylinder 129 for longitudinal adjustment relative thereto is a plug 130 having a port 131 opening to the atmosphere and also having a valve seat 132 with which cooperates an inwardly opening check valve 133 of any suitable type controlling communication between the interior of the pump cylinder 129 and the atmosphere through said port, said valve 133 being normally urged outwardly against its seat 132 in closing relationship to the port 131 by a coil spring 134 interposed between said valve and a suitable abutment such as a plug 135 threaded in the inner end portion of the plug 130 and having a port 136 therein providing communication between the cylinder 129 and the port 131 under the control of said valve 133.

As in the case of the embodiment of the invention illustrated in Figs. 1 to 3, the Fig. 4 embodiment of the invention includes a rotatably adjustable cam ring 110ᵇ disposed in the counterbore 106ᵇ of the cylinder 11ᵇ between the wall defining the inner end of said counterbore and the flange 105ᵇ of the cylinder head 104ᵇ and provided at its inner edge with a series of inclined cam faces 111ᵇ for cooperation with a companion series of cam faces 112ᵇ on the said wall defining the inner end of the counterbore 106ᵇ to variably predetermine the limit of inward movement of the cylinder head 104ᵇ.

In accordance with the Fig. 4 embodiment of the invention the spring 128 is only of sufficient strength normally to hold the cylinder head 104ᵇ at its limit of inward movement when the engine is not operating, the force to restrain said cylinder head against outward movement when the engine is operating being obtained by air pressure developed in the space b between the cap member 126 and the cylinder head 104ᵇ as a result of outward movement of said cylinder by operating pressure in the combustion chamber a' of the cylinder 11ᵇ.

The pump piston 120 in conjunction with the pump cylinder 129, the valves 123 and 133 and the ports 120', 122, 131 and 136 constitute an air pump operable by inward movement of the cylinder head 104ᵇ to drain air from the atmosphere through the ports 131 and 136 into the inner end portion of the pump cylinder 129 and, by outward movement of said cylinder head, to force air from the inner end portion of said pump cylinder 129 through the port 122, the pump piston 120 and the ports 120' into the space b between said cylinder head and the cap 126.

When the engine is operating, explosions in the combustion chamber a' force the cylinder head 104ᵇ outwardly, but when exhaust occurs and pressure in said combustion chamber a' is relieved, the spring 128 in conjunction with air pressure in the space b force said cylinder head inwardly. Accordingly, during operation of the engine the pump mechanism described will tend constantly to pump air into the space b and to create a certain air pressure therein dependent upon the capacity of the pump space between the valves 123 and 133. Obviously, the capacity of this space may be varied by adjusting the plug 130 inwardly or outwardly. Accordingly, by adjustment of said plug 130 the air pressure within the space b may be regulated so that the force exerted inwardly on the cylinder head 104ᵇ is greater than the fuel compression pressure developed in the combustion chamber a' by outward movement of the engine piston 13ᵇ, but is not as great as the force exerted outwardly upon said cylinder head by explosion of a charge of fuel in the combustion chamber a'.

To start the engine following a proper adjustment of the plug 130, the cam ring 110ᵇ is adjusted to permit the cylinder head to be moved by the spring 128 to its innermost limit of movement. The engine then is turned over a number of times manually or by a starter until there is built up in the space b an air pressure sufficient to resist outward movement of the cylinder head under a fuel compression pressure such as will produce self-ignition of the fuel charge, whereupon the engine will start.

Since varying of the size of the combustion chamber a' of the engine determines the time at which, during outward movement of the engine piston 13ᵇ, self-ignition pressure (heat due to rapid compression) will occur in said combustion chamber a', and since the time at which self-ignition occurs in a large measure determines the speed of the engine, it is obvious that the engine speed may be varied over a wide range and quickly by adjustment of the cam ring 110ᵇ to vary the innermost limit of movement of the cylinder head 104ᵇ and to thereby vary the size of the combustion chamber a'. In short, the Fig. 4 embodiment of the invention has the same mode of operation and the advantages of the Figs. 1 to 3 embodiment of the invention, except that primarily air pressure rather than a spring is employed to resiliently restrain the cylinder head against outward movement and to produce inward movement thereof.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:

1. A self-ignition internal combustion engine comprising a cylinder, a piston reciprocable therein, a member inwardly movable relative to said cylinder to decrease the space of the combustion chamber of the engine, a cam ring surrounding said member and operative by rotative adjustments thereof to predetermine the limit of inward movement of said member, and resilient means resisting outward movement of said member, said resilient means having sufficient strength to hold said member against outward movement under a fuel compression pressure in the combustion chamber such as will cause self-ignition of the fuel and having insufficient strength to hold said member against outward movement under the pressure developed in the combustion chamber by explosion of a fuel charge therein.

2. A self-ignition internal combustion engine comprising a cylinder, a piston reciprocable therein, a cylinder head mounted in the outer end portion of said cylinder for inward and outward sliding movement relative thereto to vary the size of the combustion chamber of the engine, a cam ring surrounding said cylinder head and interposed between a portion thereof and a portion of said cylinder and operative by rotative adjustment thereof to predetermine the limit of inward movement of said cylinder head, and resilient means resisting outward movement of said cylinder head, said resilient means having sufficient strength to hold said cylinder head against outward movement under a fuel compression pressure in the combustion chamber that will cause self-ignition of the fuel and having insufficient strength to hold said cylinder head against outward movement under the pressure developed in the combustion chamber by explosion of a fuel charge therein.

3. A self-ignition internal combustion engine comprising a cylinder having outwardly facing cam formations adjacent to its outer end, a piston reciprocable in said cylinder, a cylinder head mounted in the outer end portion of said cylinder for inward and outward sliding movement relative thereto to vary the size of the combustion chamber of the engine, said cylinder head having an inwardly facing shoulder, a rotatably adjustable ring surrounding said cylinder head between said shoulder and the cam formations of the cylinder and serving as a stop to limit inward movement of said cylinder head, said ring having cam formations for cooperation with the said cam formations of the cylinder to effect longitudinal adjustment of said ring in response to rotary adjustment thereof to predetermine the limit of inward movement of the cylinder head, and resilient means resisting outward movement of said cylinder head, said resilient means having sufficient strength to hold said cylinder head against outward movement under a fuel compression pressure in the combustion chamber that will cause self-ignition of the fuel and having insufficient strength to hold said cylinder head against outward movement under the pressure developed in the combustion chamber by explosion of a fuel charge therein.

4. A self-ignition internal combustion engine comprising a cylinder, a piston reciprocable therein, a member movable inwardly and outwardly relative to said cylinder to vary the size of the combustion chamber of the engine, means adjustable to predetermine the limit of inward movement of said member, means cooperating with said member to define an air chamber outwardly of said member and of which said member constitutes at least a portion of the inner wall, whereby said member is urged inwardly when said chamber is supplied with air under pressure, and means for supplying said chamber with and for maintaining therein air under a pressure sufficient to hold said member against outward movement under a fuel compression pressure in the combustion chamber that will cause self-ignition of the fuel and insufficient to hold said member against outward movement under the pressure developed in the combustion chamber by explosion of a fuel charge therein.

5. A self-ignition internal combustion engine as set forth in claim 4 in which the means for supplying to and maintaining in the air chamber air under pressure comprises an air pump operable by inward and outward movement of the member for varying the size of the engine combustion chamber.

6. A self-ignition internal combustion engine as set forth in claim 4 in which the means for supplying to and maintaining in the air chamber air under pressure comprises an air pump operable by inward and outward movement of the member for varying the size of the engine combustion chamber, and means adjustable to regulate the pumping action of said air pump in relation to the amount of inward and outward movement of said member to maintain the air in said chamber within a pressure range to accomplish the purposes stated.

7. A self-ignition internal combustion engine comprising a cylinder, a piston reciprocable therein, a cylinder head mounted in the outer end portion of said cylinder for inward and outward movement relative thereto to vary the size of the combustion chamber of the engine, means adjustable to predetermine the limit of inward movement of said cylinder head, a cap member carried by the cylinder and cooperating with said cylinder head to provide an air chamber of which said cylinder head comprises the inner wall, an air pump for supplying air to said chamber, said pump comprising a cylinder and a cooperating piston one of which is carried by said cylinder head and the other by said cap member so that said pump is operable by inward and outward movement of said cylinder head, and means for regulating the action of said pump in relation to the movement of said cylinder head so that during operation of the engine air in said air chamber is maintained under a pressure sufficient to hold said cylinder head against outward movement under a fuel compression pressure in the combustion chamber that will cause self-ignition of the fuel and insufficient to hold said cylinder head against outward movement under the pressure developed in the combustion chamber by explosion of a fuel charge therein.

THOMAS R. ARDEN.